United States Patent
Varanasi et al.

(10) Patent No.: US 6,827,970 B2
(45) Date of Patent: Dec. 7, 2004

(54) METHOD OF FORMING NIOBIUM DOPED TIN OXIDE COATINGS ON GLASS AND COATED GLASS FORMED THEREBY

(75) Inventors: Srikanth Varanasi, Toledo, OH (US); David A. Strickler, Toledo, OH (US); Kevin Sanderson, Wigan (GB)

(73) Assignee: Pilkington North America, Inc., Toledo, OH (US)

( * ) Notice: Subject to any disclaimer, the term of this patent is extended or adjusted under 35 U.S.C. 154(b) by 0 days.

(21) Appl. No.: 10/361,370

(22) Filed: Feb. 10, 2003

(65) Prior Publication Data

US 2003/0152711 A1 Aug. 14, 2003

Related U.S. Application Data

(63) Continuation of application No. 09/534,863, filed on Mar. 24, 2000, now Pat. No. 6,524,647.

(51) Int. Cl.$^7$ ............................................... C23C 16/40
(52) U.S. Cl. ................. 427/166; 427/266; 427/255.19; 427/255.32; 427/255.39; 65/60.51; 65/60.5
(58) Field of Search ................................ 427/166, 226, 427/255.19, 255.32, 255.39; 65/60.5, 60.51

(56) References Cited

U.S. PATENT DOCUMENTS 6,218,018 B1 * 4/2001 McKown et al. ........... 428/432
6,524,647 B1 * 2/2003 Varanasi et al. ............ 427/166

* cited by examiner

Primary Examiner—Timothy Meeks
(74) Attorney, Agent, or Firm—Marshall & Melhorn, LLC.

(57) ABSTRACT

A niobium doped tin oxide coating is applied onto a glass substrate to produce a low emissivity (low E) glass. The coating can optionally be doped with both niobium and other dopant(s), such as fluorine. The low emissivity glass has properties comparable or superior to conventional low E glass with fluorine doped tin oxide coatings.

10 Claims, No Drawings

METHOD OF FORMING NIOBIUM DOPED TIN OXIDE COATINGS ON GLASS AND COATED GLASS FORMED THEREBY

CROSS REFERENCE TO RELATED APPLICATIONS

This application is a continuation application claiming priority from U.S. patent application Ser. No. 09/534,863, which was filed on Mar. 24, 2000, now U.S. Pat. No. 6,524,647. U.S. patent application Ser. No. 09/534,863 is hereby expressly incorporated by reference as if set forth in its entirety herein.

BACKGROUND OF THE INVENTION

This invention relates to a film suitable for use as a coating on a glass substrate. More particularly, this invention is directed to a niobium doped tin oxide coating applied onto a glass substrate to produce a low emissivity (low E) glass.

Coatings on glass are commonly utilized to provide specific energy attenuation and light transmittance properties. Additionally, coatings are designed to reduce reflections from interfaces between individual coating layers and the glass when a plurality of coatings are applied onto a glass substrate. The coated articles are often utilized singularly, or in combination with other coated articles, to form a glazing.

The attributes of the resulting coated glass substrate are dependent upon the specific coatings applied to the glass substrate. The coating compositions and thicknesses impart energy absorption and light transmittance properties within the coated article while also affecting the spectral properties. Desired attributes may be obtainable by adjusting the compositions or thicknesses of the coating layer or layers.

A particular variety of glass product commonly used in the building industry is low E glass. A primary advantage of the low E glass is that it provides superior thermal control properties, i.e. it limits the passing of thermal energy (infrared wavelengths) through the glass, while maintaining high transmission of visible light. Low E glass can be produced through a sputter coating (soft coat) or preferably, through a pyrolytic process, for example chemical vapor deposition. Typically, glass produced through a pyrolytic process yields a coating which is less easily damaged and less likely to deteriorate under exposure to air.

Low E glass has significant uses in building products and other applications such as substrates for solar cells, display panels, heated refrigerated displays and computer screens. The lower the E value of the glass the less thermal energy is transmitted through the glass and therefore the easier it becomes to control the internal temperature of a building equipped with the low E glass. In many applications, the low E glass can also preferably be color neutral. This allows viewing through the glass with a minimal amount of color distortion. Low E glass can be used alone, or in combination with additional panes of tinted glass or reflective glass to obtain different appearances and thermal control properties.

Coatings with sheet resistance value less than about 500 ohms per square are generally considered to be conductive coatings. The emissivity of a coated glass article is directly related to its sheet resistance. By lowering the sheet resistance, or increasing the conductivity, of a glass sheet, the emissivity is reduced.

In theory, a coating of pure tin oxide on a glass substrate would have an extremely high sheet resistance. However, in practice, tin oxide coatings typically have a sheet resistance of about 350–400 ohms per square. This is due, at least in part, to an oxygen deficiency in the tin oxide, rendering it at least slightly conductive. Fluorine is often used as a tin oxide dopant in order to increase the conductivity. A fluorine doped tin oxide coating ($SnO_2$:F) can produce sheet resistances as low as about 16 $\Omega/cm^2$. When tin oxide is doped with fluorine, the fluorine will substitute for oxygen in the compound. This substitution of fluorine for oxygen is a factor in the lowered sheet resistance, due to their differing electron configurations. Other materials have been also used as dopants in various glass coating applications.

It would be advantageous to use a material as a dopant, alone or in combination with fluorine or other dopants, which results in a coating having a comparable or lowered emissivity for a given thickness, while maintaining or improving the ease and cost of manufacture of the coated glass products, and without impairing the optical qualities of the glass.

SUMMARY OF THE INVENTION

In accordance with the present invention, there is provided a film suitable for use as a coating on glass. The film is a niobium doped tin oxide which can be produced by combining a niobium source with conventional tin oxide deposition precursors. The amount of niobium present in the film is variable based on the planned application. The coating of the present invention can also be a tin oxide coating doped with both niobium and other known dopant (s), such as fluorine. The coating of the present invention can thus be used as an alternative to, or in conjunction with, fluorine doped tin oxide coatings for glass substrates, especially for use in low E glass.

The present invention further provides a process of making a coated glass sheet, preferably by a pyrolytic process, for example by chemical vapor deposition (CVD), wherein the coating includes a niobium doped layer of tin oxide, or optionally, a layer of tin oxide dual doped with niobium and fluorine.

The Nb doped coating of the present invention can be used as a single layer on a glass substrate, or in conjunction with other possible embodiments of the present invention, may be used as a layer in a multi-layer coating stack. In possible embodiments of the present invention, Nb can be used as the sole dopant for the $SnO_2$ coating, or in the alternative, Nb can be used in conjunction with other dopants, such as fluorine.

The niobium doped tin oxide can preferably be applied pyrolytically, on-line onto a float glass ribbon, by a process such as chemical vapor deposition which is well known in the art.

It is an object of the present invention to provide a coated glass material having an emissivity comparable to or lower than the emissivity of known coated glass products.

Another object of the present invention is to provide a method of making a coated glass article with a reduced emissivity.

It is a further object of the present invention to provide a conductive film that can be pyrolytically deposited onto a glass substrate.

DETAILED DESCRIPTION OF THE PREFERRED EMBODIMENT

The niobium doped tin oxide of the present invention is suitable for use with conventional tin oxide deposition precursors. The pyrolytic deposition enables the application of the film onto a float glass ribbon directly in the glass production process, preferably by CVD.

Glass substrates suitable for use in preparing the coated glass article according to the present invention may include any of the conventional clear glass compositions known in the art. The preferred substrate is a clear float glass ribbon wherein the coating of the present invention, possibly with other optional coatings, is applied in the heated zone of the float glass process. However, other conventional processes for applying coatings on glass substrates are suitable for use with the present inventive coating.

For a pyrolytic deposition, the doped tin oxide alloy is deposited onto the glass substrate by incorporating a niobium source with conventional tin oxide precursors. An example would include the use of niobium pentachloride ($NbCl_5$) in an inert gas, such as helium. The $NbCl_5$ is a solid at normal atmospheric temperatures and pressures. Thus, for use as a dopant in the CVD process, the niobium pentachloride is vaporized and injected into a gas stream. A bubbler could be used, but in production conditions it would be preferable to use equipment such as a thin film evaporator to get the niobium pentachloride into the gas stream. Other possible niobium containing compounds are possible within the scope of the present invention. A significant factor in the selection of the niobium containing material is its volatility. Typically, the Nb containing material should be volatile at temperatures between 0 and 500° F., and in a preferred embodiment of the present invention, the Nb containing material should be volatile within the temperature range of 300–500° F. Niobium pentachloride is recommended both for its low melting point and because it is readily commercially available, however the present invention is intended to incorporate any known niobium compound suitable for doping tin oxide.

If the tin oxide were to be doped with, for example, fluorine and niobium, a fluorine source would also then be used with the conventional tin oxide precursors. A preferred fluorine source would be either HF or trifluoroacetic acid (TFA), but other conventional fluorine sources could be incorporated within the scope of the invention.

Tin precursors for glass coating processes are conventional and well known in the art. An especially suitable tin containing compound is dimethyltin dichloride (DMT). This substance is well known and readily available, and is commonly used as a tin precursor material in known float glass coating applications. Other known tin precursors are also usable within the scope of the present invention.

In at least one possible process of carrying out the present invention, $NbCl_5$ and DMT are run through thin film evaporators and are then mixed with oxygen and water in a helium carrier gas. The oxygen can be provided in the form of elemental oxygen or in the form of air, depending on the process employed. Other oxygen containing materials are certainly usable within the scope of the process, but it is generally most economical to use either air or elemental oxygen. The optional fluorine containing material (preferably HF) would also be added if fluorine doping was desired. The precursor materials can then be introduced into a coater which directs the materials to the surface of a float glass ribbon. Care must be taken in the introduction of the materials however, as premature reaction of the NbCls and water are possible. A niobium doped tin oxide film is then deposited on a float glass ribbon by conventional chemical vapor deposition techniques.

In the event that fluorine and niobium are being added in a dual doping system, the fluorine precursor and the $H_2O$ can be run through the same thin film evaporator, although this is not necessary.

As opposed to conventional fluorine doping of tin oxide, wherein the fluorine atoms replace oxygen, the niobium atoms replace tin atoms in the tin oxide layer. Niobium is especially suited to this as it has a similar outer shell electron configuration to tin (5 electrons in the outer shell), and has an atomic number comparable to that of tin. Therefore, it is theorized that the niobium easily takes the place of the tin atoms in the tin oxide.

It has surprisingly been found that doping with niobium alone can yield similar sheet resistance properties to doping with fluorine. However, it has unexpectedly been found that doping with both fluorine and niobium can yield sheet resistances superior to doping with either niobium or fluorine alone.

The following examples, which constitute the best mode presently contemplated by the inventors for practicing the present invention, are presented solely for the purpose of further illustrating and disclosing the present invention, and are not to be construed as a limitation on the invention:

The following is an explanation of the data listed in Tables 1–4 below:

DMT represents the flow of dimethyltin dichloride in standard liters per minute;

$H_2O$ represents the flow of water in standard $cm^3$ per minute;

$O_2$ represents the oxygen flowrate in standard liters per minute;

$NbCl_5$ represents the niobium pentachloride flow suspended in helium in standard liters per minute;

TFA is the flow of trifluoroacetic acid in milliliters per hour (which was maintained at 0 for samples 1–5 to provide fluorine free samples);

SHR represents the sheet resistance in ohms per square; and thickness is the calculated thickness in Angstroms based on color measurements.

Samples 1–5

A first set of samples were produced using a conventional process and doped only with niobium. In the samples, dimethyltin dichloride was used as the tin source, and $H_2O$ and $O_2$ were also added. $NbCl_5$ was run through a bubbler and suspended in a helium carrier gas. Additional inert gas (He) was added to obtain the desired overall flow rate. The sheet resistance of the resultant coating was measured by the use of a four point probe. The thickness of the resultant coating was analyzed by color analysis. Alternatively, profilometry techniques could have been used to analyze the thickness of the coating.

Sample 1 included a DMT flow rate of 0.6 standard liters per minute (slm.) $H_2O$ was added at a rate of 10.3 standard $cm^3$ per minute. $O_2$ was added at the rate of 18 standard liters per minute. Sample 1 was a baseline test sample containing no niobium pentachloride. Sample 1 produce a sheet resistance of about 350–400 ohms/square and a thickness calculated at about 3800 angstroms. The remaining samples generated sheet resistances between 16 and 35 $\Omega/cm^2$ and calculated thicknesses between 3700 and 4200 A. The sheet resistance test results for the niobium doped tin oxide were similar to expected results for fluorine doped tin oxide coatings of similar thickness. The results from tests 1–5 are summarized in Table 1.

TABLE 1

| sample | DMT | H$_2$O | O$_2$ | NbCl$_5$ | TFA | SHR | thickness |
|---|---|---|---|---|---|---|---|
| 1 | 0.6 | 10.3 | 18 | 0 | 0 | 350–400 | 3800 |
| 2 | 0.6 | 10.3 | 18 | 0.5 | 0 | 25 | 3800 |
| 3 | 0.6 | 10.3 | 18 | 0.25 | 0 | 35 | 3700 |
| 4 | 0.6 | 10.3 | 18 | 1 | 0 | 16 | 4200 |
| 5 | 0.6 | 10.3 | 18 | 0.1 | 0 | 20 | 4200 |

Samples 6–12

For samples 7–12, the tin oxide layer was doped with both niobium and fluorine. The TFA and H$_2$O were run through the same thin film evaporator for these tests. Sample 6 was tested with only a fluorine dopant as a comparative baseline for the tests. The DMT, H$_2$O and O$_2$ flowrates were held constant through the tests, although at different levels than in samples 1–5.

It can be seen from Table 2 that the sheet resistances were comparable to that obtained from fluorine doping, but in at least one case the coating had a superior sheet resistance to that of a fluorine doped tin oxide layer alone.

TABLE 2

| sample | DMT | H$_2$O | O$_2$ | NbCl$_5$ | TFA | SHR | thickness |
|---|---|---|---|---|---|---|---|
| 6 | 1.26 | 7.2 | 18 | 0 | 59.73 | 14 | 3200–3700 |
| 7 | 1.26 | 7.2 | 18 | 0.25 | 59.73 | 20 | 2500–3100 |
| 8 | 1.26 | 7.2 | 18 | 0.25 | 59.73 | 12 | 3300–3800 |
| 9 | 1.26 | 7.2 | 18 | 0.35 | 59.73 | 14 | 3300–3800 |
| 10 | 1.26 | 7.2 | 18 | 0.15 | 59.73 | 14 | 3300–3800 |
| 11 | 1.26 | 7.2 | 18 | 0.35 | 40 | 14 | 2800–3300 |
| 12 | 1.26 | 7.2 | 18 | 0.35 | 70 | 16 | 2800–3300 |

Samples 13–18

Samples 13–18 were again run with no fluorine containing compound, but in these samples the water and NbCl$_5$ concentrations were both varied. As can be seen in the accompanying Table 3, varying sheet resistances were obtained depending on the sample conditions.

TABLE 3

| sample | DMT | H$_2$O | O$_2$ | NbCl$_5$ | TFA | SHR | thickness |
|---|---|---|---|---|---|---|---|
| 13 | 10 | 10 | 5.2 | 0 | 0 | 1500 | 2800 |
| 14 | 1 | 10 | 5.2 | 0.5 | 0 | 115 | 4400 |
| 15 | 1 | 10 | 5.2 | 0.2 | 0 | 50 | 4700 |
| 16 | 1 | 6 | 5.2 | 0.2 | 0 | 50 | 4700 |
| 17 | 1 | 3 | 5.2 | 0.2 | 0 | 43 | 4400 |
| 18 | 1 | 3 | 5.2 | 2.1 | 0 | 120 | 4200 |

Samples 19–32

Additional samples doped with only niobium were prepared and run with two different concentrations of DMT, while varying the amount of NbCl$_5$ supplied. Additionally, more samples were run without dopants, in order to obtain additional comparative data. It can again be seen, in the accompanying Table 4, that significant improvements in sheet resistances were obtained by doping with Nb compared to the undoped samples.

TABLE 4

| sample | DMT | H$_2$O | O$_2$ | NbCl$_5$ | TFA | SHR | thickness |
|---|---|---|---|---|---|---|---|
| 19 | 0.64 | 10 | 18 | 0 | 0 | 700 | 1800 |
| 20 | 0.64 | 10 | 18 | 0 | 0 | 500 | 1800 |
| 21 | 0.64 | 10 | 18 | 0.25 | 0 | 50–70 | 1800 |
| 22 | 0.64 | 10 | 18 | 0.35 | 0 | 60–70 | 1200–1500 |
| 23 | 0.64 | 10 | 18 | 0.45 | 0 | 60–80 | 1200 |
| 24 | 0.64 | 10 | 18 | 0.15 | 0 | 120–140 | 1200–1500 |
| 25 | 0.64 | 10 | 18 | 0 | 0 | 400 | 2600 |
| 26 | 1 | 10 | 18 | 0 | 0 | 400–700 | 3000 |
| 27 | 1 | 10 | 18 | 0 | 0 | 450–800 | 3200 |
| 28 | 1 | 10 | 18 | 0.25 | 0 | 35–40 | 3200 |
| 29 | 1 | 10 | 18 | 0.35 | 0 | 30–35 | 3200 |
| 30 | 1 | 10 | 18 | 0.55 | 0 | 30–35 | 2000–2500 |
| 31 | 1 | 10 | 18 | 1 | 0 | 35–40 | 1800–2100 |
| 32 | 1 | 10 | 18 | 0.12 | 0 | 60–70 | 3200 |

One further advantage noted from the niobium doped samples was noted when testing the Hall effect. The Hall effect was tested by running a current along the longitudinal axis of the sample. A magnetic field was then run perpendicular to the plane of the sample, generating an induced current across the sample, i.e. perpendicular to the direction of applied current flow. It is known that the induced voltage is a function of the number of electrons carrying current ($n_e$) and the mobility ($\sigma$) of the material. The highest known $n_e$ value reported in the literature for fluorine doped tin oxide is about $5.5 \times 10^{20}$ electrons per cubic centimeter (e$^-$/cm$^3$.) Testing of sample 8 indicated an electron concentration of about $7-8 \times 10^{20}$ e$^-$/cm$^3$, which is a significant increase from the values reported in the literature. The number of electrons carrying current is inversely proportional to the sheet resistance and the emissivity, therefore indicating that the higher number of electrons available to carry current in the niobium doped tin oxide could lead to even lower emissivity and sheet resistance values, and is a further sign of the improved characteristics of the niobium doped tin oxide coating on glass.

In accordance with the provisions of the patent statutes, the present invention has been described in what is considered to represent its preferred embodiment. However, it should be noted that the invention can be practiced otherwise than as specifically illustrated and described without departing from its spirit or scope. For example, other coating methods, such as sputtering, may also be utilized to form the pyrolytic coating of the present invention.

What is claimed is:

1. A method of making a coated glass article comprising the steps of:
    providing a glass substrate at an elevated temperature, the glass substrate having a surface on which the coating is to be deposited;
    forming a precursor mixture including a tin containing compound, an oxygen containing compound, an inert carrier gas and a niobium containing compound and directing the precursor mixture at and along the surface to be coated to form a coating on the surface of the glass substrate; and
    cooling the coated glass substrate to ambient temperature.

2. The method according to claim 1 wherein the precursor mixture further includes a fluorine containing compound.

3. The method according to claim 2 wherein the fluorine containing compound is selected from the group consisting of hydrogen fluoride and trifluoroacetic acid.

4. The method according to claim 1 wherein the precursor mixture includes H$_2$O.

5. The method according to claim 1 wherein the coating is formed to a thickness of between 2500 and 3800 Å.

6. A method of making a coated glass article comprising the steps of:
    providing a glass substrate having a surface on which a coating is to be deposited;
    directing a tin containing compound, an oxygen containing compound and a niobium containing compound to the surface on which the coating is to be deposited to form a coating on the surface of the glass substrate.

7. The method according to claim 6 wherein the precursor mixture further includes a fluorine containing compound.

8. The method according to claim 7 wherein the fluorine containing compound is selected from the group consisting of hydrogen fluoride and trifluoroacetic acid.

9. The method according to claim 6 wherein the precursor mixture includes $H_2O$.

10. The method according to claim 6 wherein the coating is formed to a thickness of between 2500 and 3800 Å.

* * * * *